UNITED STATES PATENT OFFICE.

JOHN E. LAUER, OF NEW YORK, N. Y.

IMPROVED ACID COMPOUND FOR USE IN BAKING AND COOKING.

Specification forming part of Letters Patent No. 62,277, dated February 19, 1867.

*To all whom it may concern:*

Be it known that I, JOHN E. LAUER, of the city, county, and State of New York, have invented a new and Improved Acid Compound to be used with bicarbonate of soda for baking and cooking purposes; and I do hereby declare that the following is a full, clear, and exact statement of the mode of making the same and preparing it for use.

I take seven (7) pounds of the bone-black of commerce, and dissolve it in ten (10) pounds of the hydrochloric (muriatic) acid, of ordinary commercial strength, diluted with twenty (20) pounds of water. After the expiration of forty-eight (48) hours I draw off the clean liquor, subject the sediment to pressure to obtain the remaining liquor, and filter the whole. To this solution, now weighing about thirty-four (34) pounds, I slowly add five (5) pounds of sulphuric acid of ordinary commercial strength. The result of this will be a soft mass of about the consistency of thick mush, which I dry with a gentle heat until it will crumble into a powder. This powder, which is my invention, is perfectly white, with a strong, agreeable sour taste, and weighs about fourteen pounds. It is obtained at a cost, including material and labor, of about ten (10) cents per pound, which is less than one-fourth of the present market price of powdered cream of tartar, for which it is used as a substitute.

As this powder or acid salt is stronger than cream of tartar—that is to say, a less weight than of cream of tartar will neutralize a given quantity of bicarbonate of soda, I prefer, before introducing it into the market, to mix with it about one-quarter of its own weight of powdered starch, to reduce it to the same acid strength as cream of tartar, so that it may be used in baking and other culinary purposes as a substitute for cream of tartar, in about the same quantities, viz., twenty (20) parts by weight to eight and eight-tenths (8.8) parts of bicarbonate of soda.

What I claim as my invention, and desire to secure by Letters Patent, is—

The acid powder of salt obtained by the treatment of bone-black with hydrochloric and sulphuric acid, substantially as herein specified.

JNO. E. LAUER.

Witnesses:
J. W. COOMBS,
G. W. REED.